United States Patent
Liu

(10) Patent No.: US 8,036,209 B2
(45) Date of Patent: Oct. 11, 2011

(54) METHOD AND APPARATUS FOR ANNOUNCEMENT FOR SESSION

(75) Inventor: Zhenhua Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 730 days.

(21) Appl. No.: 11/970,904

(22) Filed: Jan. 8, 2008

(65) Prior Publication Data
US 2008/0108320 A1   May 8, 2008

Related U.S. Application Data

(63) Continuation of application No. PCT/CN2006/000616, filed on Apr. 6, 2006.

(30) Foreign Application Priority Data

Jul. 11, 2005 (CN) .......................... 2005 1 0079389

(51) Int. Cl.
*H04L 12/66* (2006.01)
*H04M 1/66* (2006.01)
(52) U.S. Cl. ........................ 370/352; 455/406
(58) Field of Classification Search .................. 370/352, 370/338, 466, 353, 400, 315, 232, 218, 351, 370/389, 392, 390, 402, 256, 410, 408, 85; 379/201.12, 201.01, 229, 373.02, 202.01, 379/67, 200, 211, 89, 207, 112, 114, 100, 379/94, 91, 93.01; 455/406; 705/7, 8, 9, 705/11, 1, 27, 26; 709/104, 223, 226
See application file for complete search history.

(56) References Cited

U.S. PATENT DOCUMENTS

| | | | | |
|---|---|---|---|---|
| 5,068,888 A | * | 11/1991 | Scherk et al. | 379/100.11 |
| 5,115,495 A | * | 5/1992 | Tsuchiya et al. | 709/239 |
| 5,146,488 A | * | 9/1992 | Okada et al. | 379/88.04 |
| 5,493,689 A | * | 2/1996 | Waclawsky et al. | 710/1 |
| 5,533,009 A | * | 7/1996 | Chen | 370/232 |

(Continued)

FOREIGN PATENT DOCUMENTS

CN      1486069      3/2004

(Continued)

OTHER PUBLICATIONS

Handley et al., "Multicast-Scope Zone Announcement Protocol (MZAP)," IETF Standard, Internet Engineering Task Force, pp. 1-28 (2000).

(Continued)

*Primary Examiner* — Melody Mehrpour
(74) *Attorney, Agent, or Firm* — Marshall, Gerstein & Borun LLP

(57) ABSTRACT

A method for an announcement for a session includes: adding at least one playing termination in a context of a session; setting up a topology descriptor between a playing termination and a termination which is about to listen to the announcement in the context; and playing the announcement by the playing termination to the termination connected to the playing termination. An apparatus for an announcement for a session includes a playing termination setting unit, a topology descriptor setting unit and an announcement-playing unit. The present invention ensures that a user can always hear complete announcement even when a termination operable for playing an announcement is deleted or removed from the context and thus cannot play the announcement any more.

17 Claims, 3 Drawing Sheets

U.S. PATENT DOCUMENTS

| | | | | |
|---|---|---|---|---|
| 5,544,229 | A | * | 8/1996 | Creswell et al. .......... 379/114.05 |
| 5,555,017 | A | * | 9/1996 | Landante et al. .......... 348/14.09 |
| 5,719,942 | A | * | 2/1998 | Aldred et al. ................. 709/228 |
| 5,747,781 | A | * | 5/1998 | Kim et al. ...................... 219/685 |
| 5,751,791 | A | * | 5/1998 | Chen et al. ................. 379/88.13 |
| 5,764,750 | A | * | 6/1998 | Chau et al. ..................... 379/229 |
| 5,790,546 | A | * | 8/1998 | Dobbins et al. ............... 370/400 |
| 5,822,309 | A | * | 10/1998 | Ayanoglu et al. .............. 370/315 |
| 5,867,494 | A | * | 2/1999 | Krishnaswamy et al. .... 370/352 |
| 5,867,495 | A | * | 2/1999 | Elliott et al. ................... 370/352 |
| 5,872,773 | A | * | 2/1999 | Katzela et al. ................. 370/256 |
| 5,889,761 | A | * | 3/1999 | Yamato ........................ 370/231 |
| 5,894,512 | A | * | 4/1999 | Zenner ..................... 379/265.02 |
| 5,903,558 | A | * | 5/1999 | Jones et al. .................... 370/351 |
| 5,905,736 | A | * | 5/1999 | Ronen et al. ................... 370/546 |
| 5,995,503 | A | * | 11/1999 | Crawley et al. ............... 370/351 |
| 6,064,982 | A | * | 5/2000 | Puri ........................... 705/26.41 |
| 6,094,431 | A | * | 7/2000 | Yamato et al. ........... 370/395.21 |
| 6,104,701 | A | * | 8/2000 | Avargues et al. ............. 370/238 |
| 6,182,136 | B1 | | 1/2001 | Ramanathan et al. ........ 709/224 |
| 6,286,047 | B1 | * | 9/2001 | Ramanathan et al. ........ 709/224 |
| 6,404,747 | B1 | * | 6/2002 | Berry et al. .................... 370/270 |
| 6,611,867 | B1 | | 8/2003 | Bowman-Amuah .......... 709/224 |
| 6,731,625 | B1 | * | 5/2004 | Eastep et al. ................... 370/352 |
| 6,909,708 | B1 | * | 6/2005 | Krishnaswamy et al. .... 370/352 |
| 7,315,826 | B1 | * | 1/2008 | Guheen et al. ............... 705/7.29 |
| 7,359,182 | B2 | * | 4/2008 | Kangas ........................ 361/627 |
| 7,716,077 | B1 | * | 5/2010 | Mikurak ...................... 705/7.12 |
| 7,774,375 | B2 | * | 8/2010 | Rudolph et al. .............. 707/802 |
| 7,869,425 | B2 | * | 1/2011 | Elliott et al. ................... 370/352 |
| 2002/0064149 | A1 | * | 5/2002 | Elliott et al. ................... 370/352 |
| 2003/0031137 | A1 | * | 2/2003 | Mecklin Tomas ............ 370/252 |
| 2004/0064351 | A1 | * | 4/2004 | Mikurak ............................ 705/7 |
| 2004/0208132 | A1 | | 10/2004 | Neulist et al. |
| 2005/0076117 | A1 | | 4/2005 | Hou et al. |
| 2009/0060158 | A1 | * | 3/2009 | Mertz et al. .............. 379/202.01 |

FOREIGN PATENT DOCUMENTS

| | | |
|---|---|---|
| CN | 1494288 | 5/2004 |
| CN | 1494288 A | 5/2004 |
| CN | 1494290 A | 5/2004 |
| CN | 1518305 A | 8/2004 |
| WO | WO 03/032576 | 4/2003 |

OTHER PUBLICATIONS

Handley et al., "Session Announcement Protocol," (2000) Retrieved from the Internet on Jan. 21, 2002: URL:ftp://ftp.isi.edu/in-notes/rfc2974.txt.

Supplementary European Search Report for Application No. EP06722268, dated Jul. 14, 2008.

European Office Action for corresponding Application No. 06722268, dated Oct. 12, 2009.

First Office Action for Chinese Application No. 200510079389.4, dated Oct. 26, 2007.

Second Office Action for Chinese Application No. 200510079389, dated Apr. 11, 2008.

International Preliminary Report on Patentability for Application No. PCT/CN2006/000616, dated Jan. 16, 2008.

International Search Report and Written Opinion for Application No. PCT/CN2006/000616, dated Aug. 17, 2006.

* cited by examiner

METHOD AND APPARATUS FOR ANNOUNCEMENT FOR SESSION

CROSS-REFERENCE TO RELATED APPLICATIONS

This is a continuation of International Application No. PCT/CN2006/000616, filed Apr. 6, 2006, which claims the priority benefit of Chinese Patent Application No. 200510079389.4, filed Jul. 11, 2005, the entire respective disclosures of which is incorporated herein by reference.

FIELD OF THE INVENTION

The present invention relates to session processing technologies in communication systems, and particularly, to a method and apparatus for an announcement for a session.

BACKGROUND OF THE INVENTION

In a 3rd Generation mobile communication system (e.g. 3G WCDMA system) of Release 4 or a later release, a Mobile Switching Center (MSC) in a Circuit Switched (CS) domain is divided into two network elements: MSC server and Media GateWay (MGW). In the Legacy MS Domain (LMSD) of CDMA2000 system, the MSC is also divided into two network elements: Mobile Switching Center Emulation (MSCE) and MGW. In a Next Generation Network (NGN) system, a conventional switch is also divided into two network elements: Media Gateway Control Function (MGCF) and MGW.

The MSC server, the MGCF and the MSCE obtained by division are mainly applied to perform functions of call control layer, and the MGW is mainly applied to perform functions of media processing and bearer processing. Soft switch devices including the MSC server, the MGCF and the MSCE usually adopt H.248 protocol or Media Gateway Control Protocol (MGCP) to control the MGW. The basic principle of the H.248 protocol and the MGCP is to implement communications between terminations by describing connections between the terminations in the context (i.e. describing topologies between the terminations). In Customized Application 4 for Mobile network Enhanced Logic (CAMEL4) standard, the standard model is required to support an announcement for a session, i.e. it should be guaranteed that all parties in the session can hear the announcement, or several users in the session can hear the announcement at the same time or different user groups in the session can hear different announcements. The session is usually defined based on a service layer while the context is usually defined based on an H.248 protocol layer or MGCP layer. One session may use multiple contexts, but usually a general session uses only one context.

In a device adopting the H.248 protocol or the MGCP, a conventional method in CAMEL4 for an announcement for a session is described below.

A service termination is chosen from a context of a session and the service termination is required to be able to play an announcement internally and externally at the same time. "Internally" and "externally" refer to the internal area and external area of the context respectively, the announcement is performed by setting an announcement signal in the termination and the usages of the announcement signal may refer to signal definitions and requirements in the H.248 protocol and the MGCP. FIG. 1 is a schematic diagram illustrating a topology descriptor for termination T1 playing an announcement for a session in a context of the session.

As shown in FIG. 1, in the context C1, there are three terminations T1, T2 and T3 involved in a session at the same time, and the three terminations are connected with corresponding users or devices. The terminations T1 and T2 are connected with a bothway topology descriptor (shown as a double arrowed line, topology descriptor (T1, T2, bothway) means that the Termination T2 receives media from the Termination T1, and vice versa); the terminations T1 and T3 are connected with a oneway topology descriptor (shown as a single arrowed line, topology descriptor (T1, T3, oneway) means that the Termination T3 receives media from the Terminations T1, but not vice versa); and the terminations T2 and T3 are topologically isolated (topology descriptor (T2, T3, isolated) means that the Termination T2 does not receive media from the Termination T1, nor vice versa), i.e. there is no arrowed line as shown in FIG. 1). If external users or devices connected to the terminations T1, T2 and T3 respectively are required to hear an announcement for the session at the same time (e.g. system broadcast, background music, etc.), the termination T1 should be chosen for the context C1 to play an announcement for the session internally and externally (i.e. an announcement signal should be set at T1). Thereby, users or devices connected to the terminations (including the terminations T2 and T3) connected with the termination T1 within the context C1 can hear the announcement, and the external users (or devices) connected to the termination T1 can also hear the announcement at the same time. The T1/T2/T3 which are not dedicated terminations to play announcement in the context C1 and they are usually called service terminations and T1 temporarily acts as a playing announcement.

However, as can be seen from FIG. 1, if the termination T1 is deleted or removed from the context C1 during the announcement because of service demands, e.g. in the case that the termination T1 hooks up or T1 and T2 are topologically isolated before the session corresponding to the context C1 is terminated, users connected to terminations T2 and T3 will not hear complete announcement though the announcement of termination T1 for the context C1 is not completed yet. Furthermore, if another termination (e.g. the termination T2 or T3) is chosen to play an announcement in such a case, there may be the following problems.

Firstly, the H.248 protocol and the MGCP only support the announcement by a termination within the context, but do not support the function of recording a stopping point where the termination stops the announcement. In other words, if the announcement of a termination is interrupted in normal condition, the H.248 protocol or the MGCP can not exactly learn how long the termination has played the announcement, as a result, when another termination in the same context is chosen to play the announcement, the announcement cannot be resumed from the stopping point of the previous termination. Therefore, it is difficult for users or devices connected to various terminations to hear complete announcement continuously and the announcement for the session can not be synchronized.

Secondly, it may be difficult to select another termination that is topologically connected to all the other terminations in the same context. As shown in FIG. 1, if the termination T1 is deleted (for example, suddenly shut down by a user), or removed, or modified to have different topology descriptors before the announcement is completed, there is no another termination topologically connected to all the other terminations in the context C1 because the termination T2 is connected to the termination T1 with a bothway topology descriptor. The termination T3 is connected to the termination T1 with a oneway topology descriptor and is isolated from the termination T2. Therefore, if T1 is deleted or removed from the context C1, it is impossible to choose another termination (either T2 or T3) in the context C1 to make both the terminations T2 and T3 hear the resumed announcement (because no another termination is connected to both T2 and T3). Therefore, the terminations T2 and T3 have to play an announcement separately. However, the announcement can not be resumed from the playing point where T1 is interrupted, and the announcements heard by T2 and T3 are not synchronized.

SUMMARY OF THE INVENTION

An embodiment of the present invention provides a method for an announcement for a session, which ensures that users can hear complete announcement even when an original termination for an announcement is deleted or removed from a context and is unable to complete the announcement.

Another embodiment of the present invention provides an apparatus for an announcement for a session, which ensures that users can hear complete announcement even when an original termination for an announcement is deleted or removed from a context and is unable to complete the announcement.

To solve the technical problems addressed above, the present invention provides a technical solution as follows:

A method for an announcement for a session includes: adding at least one playing termination in a context of a session; setting up a topology descriptor between a playing termination and a termination which is about to listen to an announcement of the playing termination in the context; and playing, by the playing termination, the announcement to the termination topologically connected to the playing termination.

Preferably, different playing terminations are topologically isolated.

Preferably, the method further includes: deleting the playing termination when the announcement is completed, or modifying the topology descriptor between the playing termination and the termination which is about to listen to the announcement in the context when the announcement is completed.

Preferably, modifying the topology descriptor between the playing termination and the termination which is about to listen to the announcement in the context includes one of:
changing the topology descriptor into topological isolation; and
adding a topology descriptor with another termination.

Preferably, the topology descriptor between the playing termination and the termination which is about to listen to the announcement is one of:
a oneway topology descriptor from the playing termination to the termination which is about to listen to the announcement; and a bothway topology descriptor.

Preferably, the playing termination is a logical termination occupying no egress resource.

Preferably, the playing termination is set as a logical termination occupying no egress resource by:
predetermining an identifier index value for identifying a termination occupying no egress resource; and setting an identifier index of the playing termination as the identifier index value to indicate that the playing termination is a logical termination occupying no egress resource.

Preferably, playing the announcement by the playing termination to the termination connected to the playing termination includes:
generating, by the playing termination, an announcement media stream corresponding to an announcement signal set in the playing termination; and playing the announcement to the termination topologically connected to the playing termination by sending the announcement media stream to the termination.

Preferably, the method further includes:
modifying the announcement signal in the playing termination,
changing the topology descriptor between the playing termination with the modified announcement signal and the termination which is about to listen to the announcement before modified to be isolated, and
adding a topology descriptor between the playing termination with the modified announcement signal and a termination which is about to listen to the modified announcement.

Preferably, the playing termination is a physical termination occupying egress resources.

Preferably, playing the announcement by the playing termination to the termination connected to the playing termination includes:
generating, by the playing termination, an announcement media stream corresponding to an announcement signal set in the playing termination, and playing the announcement to the termination topologically connected to the playing termination by sending the announcement media stream to the termination.

Preferably, the method further includes: modifying the announcement signal in the playing termination, and changing the topology descriptor between the playing termination with the modified announcement signal and the termination which is about to listen to the announcement before modified to be isolated, and adding a topology descriptor between the playing termination with the modified announcement signal and a termination which is about to listen to the modified announcement.

Preferably, playing the announcement by the playing termination to the termination connected to the playing termination includes:
transmitting, by the third party announcement source, an announcement media stream to the playing termination, a bearer connection being set up between the third party announcement source and the playing termination; and playing, by the playing termination, the announcement indirectly to the termination topologically connected to the playing termination by forwarding the announcement media stream to the termination.

Preferably, the third party announcement source is set within the context or outside the context.

An apparatus for an announcement for a session includes:
a playing termination setting unit, operable for adding at least one playing termination in a context of a session; a topology descriptor setting unit, operable for setting up a topology descriptor between a playing termination and a termination which is about to listen to an announcement from the playing termination; and an announcement-playing unit, operable for triggering the playing termination to play the announcement to the termination which is topologically connected to the playing termination and is about to listen to the announcement from the playing termination.

Preferably, the topology descriptor setting unit includes:
a oneway topology descriptor setting subunit, operable for setting up a oneway topology descriptor from the playing termination to the termination which is about to listen to the announcement; and/or
a bothway topology descriptor setting subunit, operable for setting up a bothway topology descriptor between the playing termination and the termination which is about to listen to the announcement.

Preferably, the playing termination setting unit includes:

a first setting subunit, operable for setting the playing termination as a logical termination occupying no egress resource; and/or a second setting subunit, operable for setting the playing termination as a physical termination occupying egress resources.

According to embodiments of the present invention, a playing termination is added in a context of a session, and the topology descriptor is configured between the playing termination and the termination which is about to listen to the announcement in the context (i.e. the service termination T in the context). The playing termination plays the announcement to the termination topologically connected to the playing termination. Therefore, a service termination T in the context being chosen to play an announcement is avoided. The problem in the prior art is solved that users cannot hear complete announcement when a service termination playing an announcement in the context is deleted or removed from the context or modified to have different topology descriptors. Further, the difficulty of the prior art in selecting a termination which is topologically connected to all the other terminations in the context for resuming the announcement is also avoided. To sum up, the embodiments of the present invention are easy to be implemented and ensure that users can hear complete announcement when an original playing termination can not complete an announcement task because of a failure.

DETAILED DESCRIPTION OF THE INVENTION

Embodiments of the present invention are described in detail hereinafter with reference to the accompanying drawings.

Compared with the prior art, according to a method for an announcement for a session in accordance with an embodiment of the present invention, the process of playing an announcement for the whole session by a system would not be interrupted if any termination related to a user is deleted or removed from the context of the session; further, the process of playing an announcement for the whole session by the system would not be interrupted either even if an isolated termination emerges after the topology descriptors of any termination related to a user are modified by the system.

The method in accordance with the present invention may be applied to any network element managed by the H.248 protocol or the MGCP without any modification to the H.248 protocol or MGCP framework.

Figure 1:
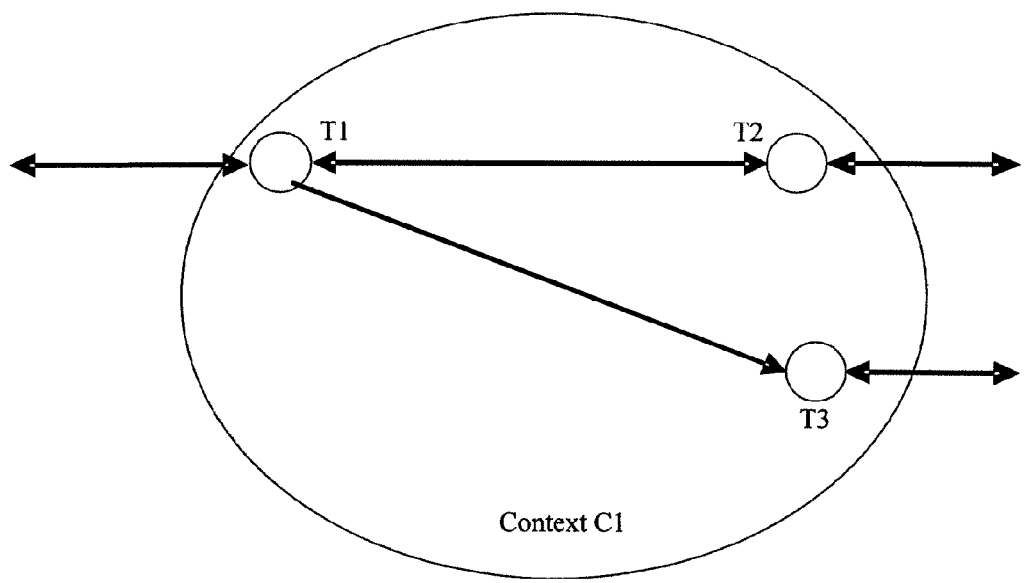
FIG. 1 is a schematic diagram illustrating a topology connection descriptor for termination T1 playing an announcement for a session in a context of the session in the prior art.
Figure 2:
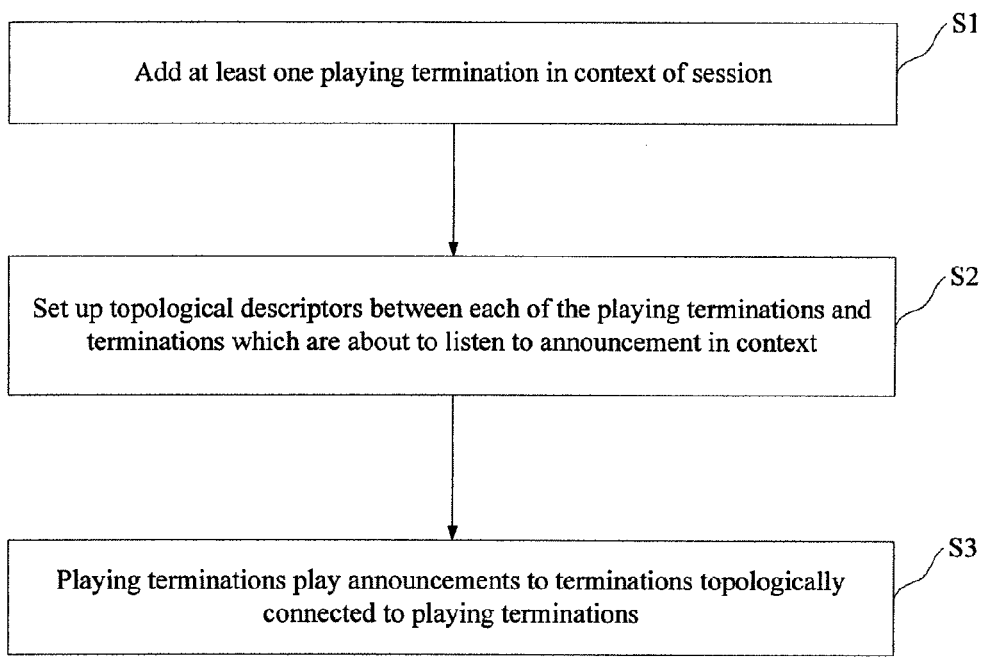
FIG. 2 is a flow chart of a method for an announcement for a session in accordance with an embodiment of the present invention.

The technical scheme of the present invention is shown in FIG. 2. FIG. 2 is a flow chart of a method for an announcement for a session in accordance with an embodiment of the present invention. The method is described below.

Block S1: Add at least one playing termination (shown as PT) in a context of a session.

Block S2: Set up topology descriptors, for each of the at least one playing termination (PT), between the playing termination and terminations which are about to listen to an announcement from the playing termination in the context.

The topology descriptors may be oneway descriptors from the playing termination to the terminations which are about to listen to the announcement from the playing termination. Optionally the topology descriptors may be bothway descriptors between the playing termination and the terminations which are about to listen to the announcement from the playing termination.

Block S3: Each of the at least one playing termination plays an announcement to the terminations topologically connected to the playing termination itself respectively, where the terminations are about to listen to the announcement.

In the H.248 protocol and the MGCP, the above Blocks S1, S2 and S3 can be performed by one message, that is, while a playing termination PT is added, the topology descriptors are indicated at the same time between the playing termination PT and the other terminations which are about to listen to the announcement, and an announcement signal is also configured in the playing termination PT at the same time.

Alternatively, the Blocks S1, S2 and S3 can be performed by multiple messages, e.g. a playing termination PT is added and an announcement signal is set in the playing termination first, and then the topology descriptors between the playing termination PT and the other terminations which are about to listen to the announcement are indicated while the playing termination PT is described. Optionally, a playing termination PT is added first; and then the topology descriptors between the playing termination PT and the other terminations which are about to listen to the announcement are indicated, and the announcement signal is set in the playing termination simultaneously.

Multiple playing terminations are set in one context so that different playing terminations can be configured to play announcements of different requirements (different playing terminations may play announcements of different contents, or play the same announcement at different time, e.g. a playing termination may play announcement A to two users firstly and play the announcement A to another two users later). In this way, different playing terminations may play announcements corresponding to different signals to terminations which are about to listen to corresponding announcement signals.

After a playing termination completes the announcement to the termination which is about to listen to the announcement, the playing termination can be deleted from the context. Optionally the topology descriptor between the playing termination and the termination which is about to listen to the announcement can be modified as topologically isolated.

Preferably, the playing terminations in the context in accordance with an embodiment of the present invention can be set as logical terminations occupying no egress resource so as to save system resources occupied. The playing terminations in the context can be set as logical terminations occupying no egress resource through the following processes in accordance with an embodiment of the present invention.

An identifier index value for identifying a termination occupying no egress resource is predetermined, and identifier indexes of the playing terminations are set with the identifier index value predetermined. Therefore the playing terminations are set to be logical terminations occupying no egress resource. In other words, some termination identifier indexes can be set within the value range of the termination identifier indexes in advance (e.g. if the value range of the termination identifier indexes is 0 to 231, some of the 232 values can be selected as the identifier indexes for identifying a termination occupying no egress resource), and it is determined that the termination identified by these identifier indexes does not occupy egress resources. If an announcement is needed, one of the identifier index values can be assigned to a playing termination to identify the playing termination as a termination occupying no egress resource. In this way, when a soft switch device (e.g. an MSC server) controls an MGW over the H.248 protocol or the MGCP, the soft switch device and the MGW can determine whether the playing termination is a logical termination occupying no egress resource according to the identifier index of the playing termination.

When the playing termination added is a logical termination occupying no egress resource, the playing termination may play an announcement to terminations which are about to listen to the announcement according to the following process:

Setting an announcement signal in the added playing termination according to requirements of the H.248 protocol or the MGCP, and configuring the direction parameter of the added playing termination to be internal, external and both. The direction parameter can be used to indicate the direction that the announcement is to be sent. "External" indicates that the announcement is sent from the context to an external point. "Internal" indicates that the announcement is played into the context to the other terminations. "Both" indicates that the announcement is played internally and externally. However, because the playing termination occupies no egress resource, the playing termination can only play an announcement to the inside of the context even when the playing termination is configured to both. This is the common knowledge in the art.

The playing termination generates an announcement media stream corresponding to the announcement signal set in the playing termination, and sends the announcement media stream to the terminations which are topologically connected to the playing termination and are about to listen to the announcement. In this way the announcement is performed and the terminations which are about to listen to the announcement can hear the announcement. The detailed process of playing an announcement according to the announcement signal can be referred to in the H.248 protocol and the MGCP.

If multiple playing terminations are set in one context, the announcement signals for the playing terminations can be modified (i.e. an existing playing termination is allowed to play a new announcement). Meanwhile, the topology descriptors between the playing termination with the modified announcement signal and the terminations which are about to listen to the announcement of the original announcement signal (i.e. the announcement before modified) are changed to be isolated, and topology descriptors between the termination with the modified announcement signal and the terminations which are about to listen to the announcement of the modified announcement signal (i.e. the modified announcement) are added.

In another embodiment of the present invention, the playing terminations set in the context can also be set as physical terminations occupying egress resources, i.e. the playing terminations occupy egress resources as existing service terminations in the context do.

If a playing termination is set as a physical termination occupying egress resources, the playing termination may play an announcement to terminations which are about to listen to the announcement according to the following two manners. In a first manner, the playing termination generates the announcement to be played (i.e. a corresponding announcement signal is set in the playing termination according to the H.248 protocol or the MGCP). In a second manner, the playing termination forwards an announcement media stream from a third party to terminations topologically connected to the playing termination according to topology descriptor relations, thereby implementing an indirect announcement.

The first manner for an announcement is described in detail as follows.

The playing termination plays the announcement directly, i.e. an announcement signal is set in the playing termination and the playing termination can play an announcement to the inside of the context or to both the inside and outside of the context, and the detailed process of playing an announcement can be referred to in the H.248 protocol or the MGCP. The playing termination generates an announcement media stream corresponding to the announcement signal set in the playing termination and sends the announcement media stream to the terminations which are topologically connected to the playing termination and are about to listen to the announcement. In this way, the terminations which are about to listen to an announcement can hear the announcement. Similarly, if multiple playing terminations are set in one context, the announcement signals in the playing terminations can be modified (i.e. an existing playing termination is allowed to play a new announcement). Meanwhile, the topology descriptors between the playing termination with the modified announcement signal and the terminations which are about to listen to the announcement of the original announcement signal are changed to be isolated, and topology descriptors between the termination with the modified announcement signal and the terminations which are about to listen to the announcement of the modified announcement signal are added.

The second manner for an announcement is described in detail as follows.

Firstly, a third party announcement source is set and a bearer connection between the third party announcement source and the playing termination is set up. The third party announcement source can be set in the same context with the playing termination (usually not recommended), or set outside the context of the playing termination. The third party announcement source sends an announcement media stream to the playing termination (the playing termination is required to support external bearer in this process, i.e. the playing termination should be able to receive data streams sent from the external to itself).

Then, the playing termination forwards the announcement media stream received to the terminations topologically connected to the playing termination, thereby realizing the announcement.

The major difference between the first manner and the second manner is that no announcement signal is set in the playing termination in the second manner (i.e. the playing termination does not play the announcement directly).

The implementation of the present invention is further described in detail with reference to embodiments of the present invention.

As described above, the technical scheme of the present invention is: adding a new termination (referred to as the playing termination PT) in a context where the announcement is required; and setting up oneway or bothway topology descriptors between the playing termination PT and the terminations which are about to listen to the announcement. If the oneway descriptors are set up, the oneway descriptors are from the playing termination PT to the terminations which are about to listen to the announcement.

After the playing termination completes the announcement, the playing termination PT may be deleted or may remain unchanged until the whole context is deleted. If the playing termination PT remains unchanged, the topology descriptors between the playing termination PT and other terminations can be changed. For example, the topology descriptors can be changed into topologically isolated or more topology descriptors may be added with part of the other terminations. Alternatively, the topology descriptors between the playing termination PT and the other terminations can also remain unchanged.

If second, third, fourth . . . Nth playing terminations PT would be added for a parallel announcement during the announcement, the playing terminations PT2, PT3, PT4, . . . , PTN can be added. Furthermore, the topology descriptors between the added playing terminations and the terminations which are about to listen to the announcement are indicated. In addition, corresponding announcement signals are set in the playing terminations PT2, PT3, PT4, . . . , PTN respectively, i.e. different playing terminations have different announcement signals, or different playing terminations have the same announcement signal but have different playing time. It should be noted that, if the announcement source is a third party announcement source, no announcement signal is needed in the playing terminations, and the playing terminations should be set in a topologically isolated state.

The terminations Ts which are about to listen to an announcement in the context should occupy system resources. Usually, the terminations are connected externally to devices such as user terminals. In order to reduce the occupation of system resources by the newly added playing terminations PTs, the termination identifier indexes of the playing terminations PTs can be limited within a specific range to indicate that the newly added playing terminations PTs are virtual terminations occupying no egress resource. However, the logic attributes of the playing terminations PTs are identical with logic attributes of normal terminations. Therefore, the newly added playing terminations PTs occupy no extra system resource. In the technical scheme of the present invention, new playing terminations need be added for an announcement and the new playing terminations may occupy system resources. In order to reduce the system resources occupied by the new playing terminations, the playing terminations can be set as logical terminations which are not connected to real users or external devices. Therefore, the new playing terminations will not waste any system resource. For example, in the technical scheme of the prior art, if a termination in the context is a TDM termination, the termination will occupy a physical time slot of 64 K. If the termination is an IP termination, the termination will occupy an IP address and an UDP port. If the termination is an ATM termination, the termination will occupy ATM related resources. However, in embodiments of the present invention, two parties using the H.248 protocol or the MGCP designate a range of termination identifier indexes so as to set the playing terminations as occupying no egress resource, thus avoiding the relevant relation between the playing terminations PT and the physical resources such as the TDM, IP or ATM, and further avoiding occupation of the system egress resources.

The length of a standard termination identifier index is 4 bytes, i.e. 32 bits, including two parts: a termination type field (3 bits) and an index field X (29 bits). The schematic diagram of the length of the standard termination identifier index is shown as follows:

Termination type field Index field X

The termination type field is defined as follows:
000 Reserved;
001 Ephemeral termination (i.e. termination occupying ATM or IP resources, an egress);
010 TDM termination (an egress);
011-110 Reserved;
111 Reserved for ROOT termination ID.

As can be seen, two parties using the H.248 protocol or the MGCP can configure in advance some termination identifier indexes for identifying terminations occupying no egress resource (e.g. configure values 210 to 212 from termination identifier indexes 0 to 231 for identifying terminations occupying no egress resource; certainly, also configure other values from the termination identifier indexes 0 to 231 for identifying terminations occupying no egress resource). Therefore, whether the playing terminations are the terminations occupying no egress resource can be determined based on the termination identifier indexes. In this way, the newly added playing terminations in the context may save the system resources.

Figure 3:
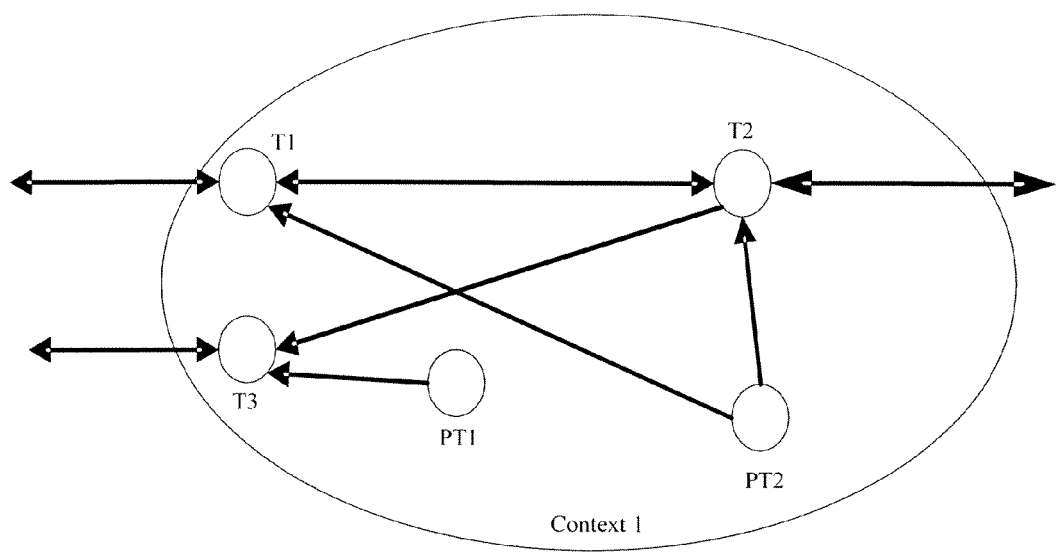
FIG. 3 is a schematic diagram illustrating a process of playing an announcement to terminations in the context through adding a new playing termination in the context.

FIG. 3 is a schematic diagram illustrating the process of playing an announcement for terminations in the context through adding a playing termination in the context. As shown in FIG. 3, the context C1 includes service terminations T1/T2/T3 originally. The topology descriptors between the service terminations are described below.

The termination T1 is connected to the termination T2 with a bothway topology descriptor, the termination T2 is connected to the termination T3 with a oneway topology descriptor, and the termination T1 and the termination T3 are topologically isolated. If the system requires the terminations T1 and T2 to hear announcement 2 and the termination T3 to hear announcement 1 but not announcement 2, a playing termination PT2 can be added for processing announcement 2. The topology descriptors from the playing termination PT2 to the terminations T1 and T2 are oneway topology descriptors respectively, and the playing termination PT2 and the termination T3 are topologically isolated. If an internal announcement signal is set in the playing termination PT2, the users (or devices) connected to the terminations T1 and T2 can hear announcement 2 of the system synchronously, but the termination T3 cannot hear announcement 2 because the termination T3 and the playing termination PT2 are not topologically connected (i.e. are isolated). It can be seen that the playing termination PT2 will not be affected concerning an announcement even if the topology descriptors between the terminations T1, T2 and T3 change or any of the terminations T1, T2 and T3 is deleted. Furthermore, if the terminal T3 is required to hear only announcement 1 during the announcement 2, playing termination PT1 can be added and a oneway or bothway descriptor can be set up between the playing termination PT1 and the termination T3. The termination T3 can thus hear announcement 1 from the playing termination PT1.

After the playing terminations PT1 and PT2 complete the announcement, the playing terminations PT1 and PT2 may remain in the context C1 or be deleted; or the playing terminations PT1 and PT2 may be partially modified, e.g. the topology descriptors from the playing termination PT1 or PT2 to target terminations can be described again if there is a new announcement, where some modification of the topology descriptors and announcement signal may be needed.

In an embodiment of the present invention, the playing terminations can be set as logical terminations occupying no system egress resource. Though system resources can be saved, the conventional H.248 protocol and MGCP have to be extended partially. Therefore, for the purpose of protocol compatibility, the settings described above can be cancelled and the playing terminations are set as physical terminations occupying system egress resources.

If the playing terminations are physical terminations occupying system egress resources, announcement signals can be set in the playing terminations and the playing terminations can generate announcement media streams corresponding to the announcement signals. The playing terminations send the corresponding announcement media streams to terminations topologically connected to the playing terminations to realize the announcement. Optionally, the newly added playing terminations PTs do not play an announcement directly, and a soft switch device sends a parameter to enable the playing terminations PTs to support external bearer so that the playing terminations PTs can receive data streams from the external. In other words, an announcement source outside the context plays the announcement, and the playing terminations PTs receive the announcement from the external announcement source and forward the announcement to the terminations topologically connected to the playing terminations.

Figure 4:
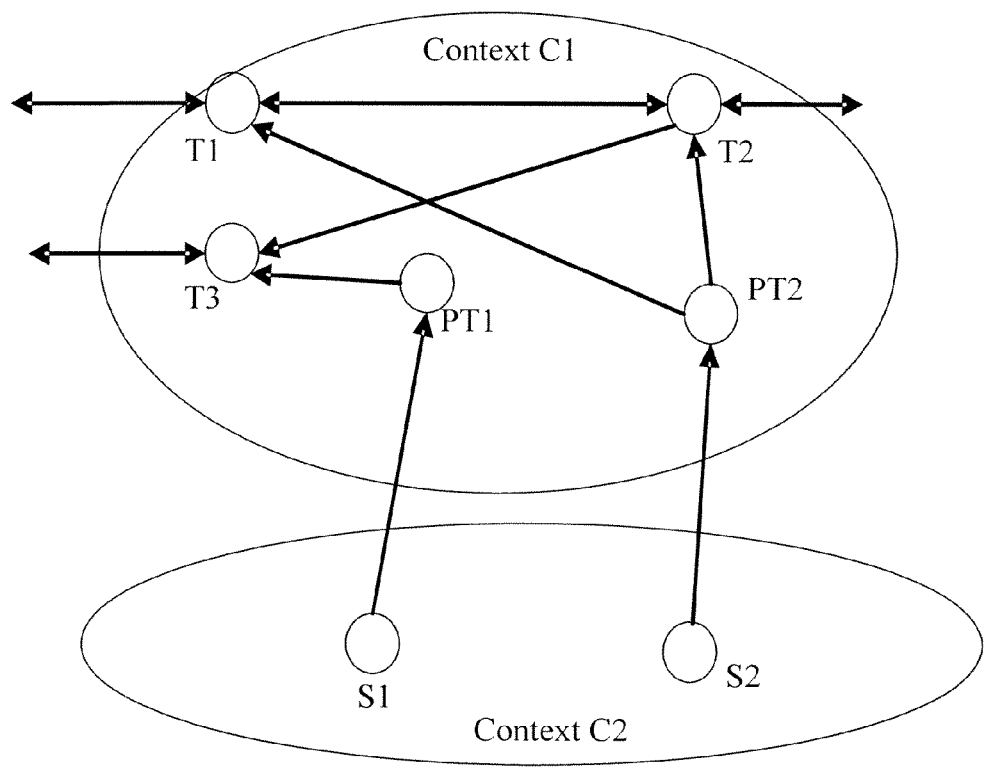
FIG. 4 is a schematic diagram illustrating a process of receiving an external announcement by a playing termination added and playing the external announcement to a termination within the context in accordance with an embodiment of the present invention.

FIG. 4 is a schematic diagram illustrating a process of receiving an external announcement by a playing termination added and playing the external announcement to terminations within a context in accordance with an embodiment of the present invention. As shown in FIG. 4, a new context C2 is added outside the context C1 including the newly added playing terminations PT1 and PT2, and new announcement source terminations S1 and S2 are added in the new context C2. Further, a bearer connection is further set up between the announcement source termination S1 and the playing termination PT1 as well as a bearer connection between the announcement source termination S2 and the playing termination PT2. In this way, the announcement source terminations S1 and S2 can play an announcement to the external playing terminations PT1 and PT2 respectively. The playing terminations PT1 and PT2 receive the announcement from the announcement source terminations S1 and S2 respectively, and forward the announcement to the terminations topologically connected to PT1 and PT2 respectively within the context C1 (the playing termination PT1 plays the announcement to the termination T3; the playing termination PT2 plays the announcement to the terminations T1 and T2). The context C2 and context C1 can be at one device or at different devices. If multiple announcements should be played, multiple new contexts and new announcement source terminations Ss can be added, or multiple new playing terminations Ss can be added into the new context C2.

It can be seen that the method for an announcement for a session according to embodiments of the present invention can be performed within the framework of the H.248 protocol and the MGCP, and the complicated intelligent announcement services thus become more flexible and easier to be controlled. The problem is thus avoided that it is difficult to describe and manage announcement services in the conventional method for an announcement, and fatal flaws in the conventional methods for an announcement are avoided.

Figure 5:
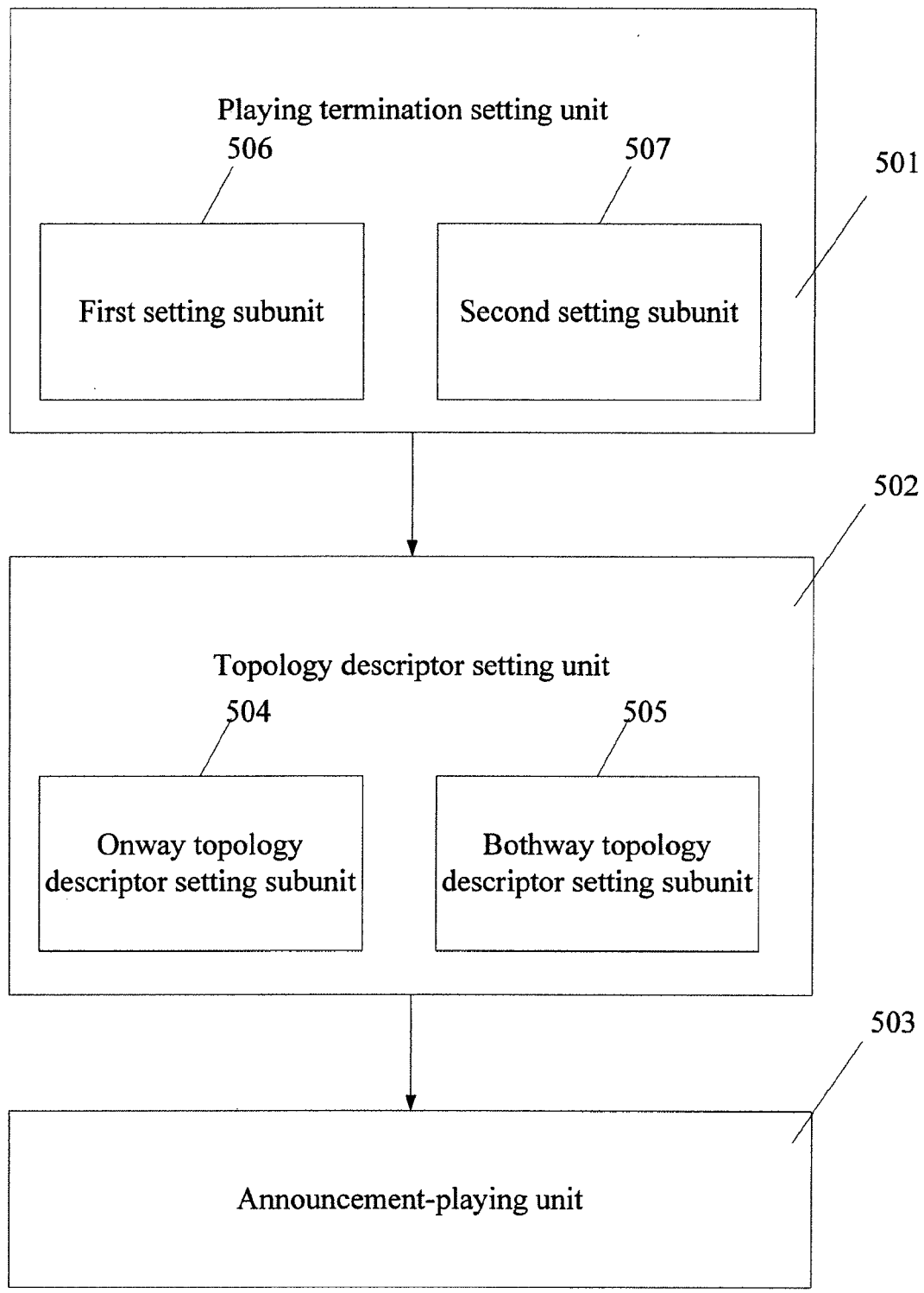
FIG. 5 is a schematic diagram illustrating a structure of an apparatus for an announcement for a session in accordance with an embodiment of the present invention.

FIG. 5 is a schematic diagram illustrating a structure of an apparatus for an announcement for a session in accordance with an embodiment of the present invention. As shown in FIG. 5, the apparatus includes:

playing termination setting unit 501, operable for adding at least one playing termination in a context of a session, and particularly for setting an announcement signal in the playing termination;

topology descriptor setting unit 502, operable for setting up a topology descriptor between the playing termination and a termination which is about to listen to an announcement from the playing termination; and announcement-playing unit 503, operable for triggering the playing termination to play the announcement to the termination that is topologically connected to the playing termination and is about to listen to the announcement from the playing termination.

The topology descriptor setting unit 502 includes:

oneway topology descriptor setting subunit 504, operable for setting up a one-way topology descriptor from the playing termination to a termination which is about to listen to the announcement; and bothway topology descriptor setting subunit 505, operable for setting up a bothway topology descriptor between the playing termination and a termination which is about to listen to an announcement.

Preferably, the topology descriptor setting unit 502 may only include the one-way topology descriptor setting subunit 504, or only include the bothway topology descriptor setting subunit 505.

The playing termination setting unit 501 includes:

first setting subunit 506, operable for setting the playing termination as a logical termination occupying no egress resource; and second setting subunit 507, operable for setting the playing termination as a physical termination occupying egress resources.

Optionally the playing termination setting unit 501 includes only the first setting subunit 506, or includes only the second setting subunit 507.

Obviously, those skilled in the art may make numerous changes and variations on the solution of the present invention without departing from the scope thereof. Accordingly, it is intended that the present invention includes the changes and variations in the case that such changes and variations come within the scope as set forth in the appended claims and the equivalent techniques thereof.

What is claimed is:

1. A method for an announcement for a session, the method comprising:
   adding at least one playing termination into a context of a session to play an announcement;
   setting up a topology descriptor between a playing termination and a termination which is about to listen to the announcement from the playing termination in the context; and
   playing, by the playing termination, the announcement to the termination topologically connected to the playing termination.

2. The method of claim 1, wherein different playing terminations are topologically isolated.

3. The method of claim 1, further comprising one of:
   deleting the playing termination when the announcement is completed; and
   modifying the topology descriptor between the playing termination and the termination which is about to listen to the announcement in the context when the announcement is completed.

4. The method of claim 3, wherein modifying the topology descriptor between the playing termination and the termination which is about to listen to the announcement in the context comprises one of:

changing the topology descriptor into topological isolation; and adding a topology descriptor with another termination.

5. The method of claim 1, wherein the topology descriptor between the playing termination and the termination which is about to listen to the announcement is one of:

a oneway topology descriptor from the playing termination to the termination which is about to listen to the announcement; and a bothway topology descriptor.

6. The method of claim 1, wherein the playing termination is a logical termination occupying no egress resource.

7. The method of claim 6, wherein the playing termination is set as a logical termination occupying no egress resource by:

predetermining an identifier index value for identifying a termination occupying no egress resource; and setting an identifier index of the playing termination as the identifier index value to indicate that the playing termination is a logical termination occupying no egress resource.

8. The method of claim 7, wherein playing the announcement by the playing termination to the termination connected to the playing termination comprises:

generating, by the playing termination, an announcement media stream corresponding to an announcement signal set in the playing termination; and playing the announcement to the termination topologically connected to the playing termination by sending the announcement media stream to the termination.

9. The method of claim 8, further comprising:

modifying the announcement signal in the playing termination;

changing the topology descriptor between the playing termination with the modified announcement signal and the termination which is about to listen to the announcement before modified to be isolated; and adding a topology descriptor between the playing termination with the modified announcement signal and a termination which is about to listen to the modified announcement.

10. The method of claim 1, wherein the playing termination is a physical termination occupying egress resources.

11. The method of claim 10, wherein playing the announcement by the playing termination to the termination connected to the playing termination comprises:

generating, by the playing termination, an announcement media stream corresponding to an announcement signal set in the playing termination; and playing the announcement to the termination topologically connected to the playing termination by sending the announcement media stream to the termination.

12. The method of claim 11, further comprising:

modifying the announcement signal in the playing termination; and changing the topology descriptor between the playing termination with the modified announcement signal and the termination which is about to listen to the announcement before modified to be isolated; and adding a topology descriptor between the playing termination with the modified announcement signal and a termination which is about to listen to the modified announcement.

13. The method of claim 10, wherein playing the announcement by the playing termination to the termination connected to the playing termination comprises:

transmitting, by a third party announcement source, an announcement media stream to the playing termination, wherein a bearer connection is set up between the third party announcement source and the playing termination; and playing, by the playing termination, the announcement to the termination topologically connected to the playing termination by forwarding the announcement media stream to the termination.

14. The method of claim 13, wherein the third party announcement source is set within the context or outside the context.

15. An apparatus for an announcement for a session, the apparatus comprising:

a playing termination setting unit, operable for adding at least one playing termination into a context of a session to play an announcement;

a topology descriptor setting unit, operable for setting up a topology descriptor between a playing termination and a termination which is about to listen to an announcement from the playing termination; and an announcement-playing unit, operable for triggering the playing termination to play the announcement to the termination which is topologically connected to the playing termination and is about to listen to the announcement from the playing termination.

16. The apparatus of claim 15, wherein the topology descriptor setting unit comprises at least one of:

a oneway topology descriptor setting subunit, operable for setting up a one-way topology descriptor from the playing termination to the termination which is about to listen to the announcement; and a bothway topology descriptor setting subunit, operable for setting up a bothway topology descriptor between the playing termination and the termination which is about to listen to the announcement.

17. The apparatus of claim 15, wherein the playing termination setting unit comprises at least one of:

a first setting subunit, operable for setting the playing termination as a logical termination occupying no egress resource; and a second setting subunit, operable for setting the playing termination as a physical termination occupying egress resources.

* * * * *